(12) United States Patent
Jung et al.

(10) Patent No.: US 9,947,906 B2
(45) Date of Patent: Apr. 17, 2018

(54) DEVICE FOR SECURING A BATTERY

(71) Applicant: Samsung Electronics Co., Ltd., Gyeonggi-do (KR)

(72) Inventors: Min Su Jung, Seoul (KR); Yong Seok Lee, Seoul (KR); Hong Moon Chun, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 283 days.

(21) Appl. No.: 14/796,586

(22) Filed: Jul. 10, 2015

(65) Prior Publication Data

US 2016/0020444 A1 Jan. 21, 2016

(30) Foreign Application Priority Data

Jul. 15, 2014 (KR) .................. 10-2014-0089303

(51) Int. Cl.
*H01M 2/10* (2006.01)

(52) U.S. Cl.
CPC ...... *H01M 2/1066* (2013.01); *H01M 2220/30* (2013.01)

(58) Field of Classification Search
CPC .............. H01M 2/1066; H01M 2220/30
USPC .............................................. 429/120
See application file for complete search history.

(56) References Cited

U.S. PATENT DOCUMENTS

2004/0202922 A1* 10/2004 Tsai ............... H01M 2/1066
429/96
2014/0120379 A1 5/2014 Baek et al.

FOREIGN PATENT DOCUMENTS

KR 10-2005-0039938 5/2005
KR 10-2014-0055949 5/2014

* cited by examiner

*Primary Examiner* — Gary Harris
(74) *Attorney, Agent, or Firm* — The Farrell Law Firm, P.C.

(57) ABSTRACT

An electronic device includes a front case including a first battery slot that detachably receives a battery, and a first protruding part protruded from a first sidewall of the first battery slot, wherein the first protruding part is disposed at a predetermined height from a bottom surface of the first battery slot.

18 Claims, 18 Drawing Sheets

DEVICE FOR SECURING A BATTERY

PRIORITY

This application claims priority under 35 U.S.C. § 119(a) to a Korean Patent Application filed on Jul. 15, 2014, in the Korean Intellectual Property Office and assigned Serial number 10-2014-0089303, the entire disclosure of which is incorporated herein by reference.

BACKGROUND

1. Field of the Invention

The present invention relates generally to an electronic device for securing a battery to prevent its detachment from the electronic device.

2. Description of the Related Art

A battery for supplying power to an electronic device may be detachable by a user or may be embedded in the electronic device. When the battery is detachable from the electronic device, there is a need to properly secure the battery during use of the electronic device in order to prevent an unintended detachment of the battery.

SUMMARY

The present disclosure has been made to address at least the problems and disadvantages described above, and to provide at least the advantages described below.

Accordingly, an aspect of the present disclosure is to provide an electronic device that properly secures a battery thereto in order to prevent an unintended detachment of the battery.

In accordance with an aspect of the present disclosure, an electronic device is provided. The electronic device includes a front case including a first battery slot that detachably receives a battery, and a first protruding part protruded from a first sidewall of the first battery slot, wherein the first protruding part is disposed at a predetermined height from a bottom surface of the first battery slot.

BRIEF DESCRIPTION OF THE DRAWINGS

The above and other aspects, features, and advantages of certain embodiments of the present disclosure will be more apparent from the following detailed description taken in conjunction with the accompanying drawings, in which.

DETAILED DESCRIPTION OF EMBODIMENTS OF THE PRESENT INVENTION

Figure 1:
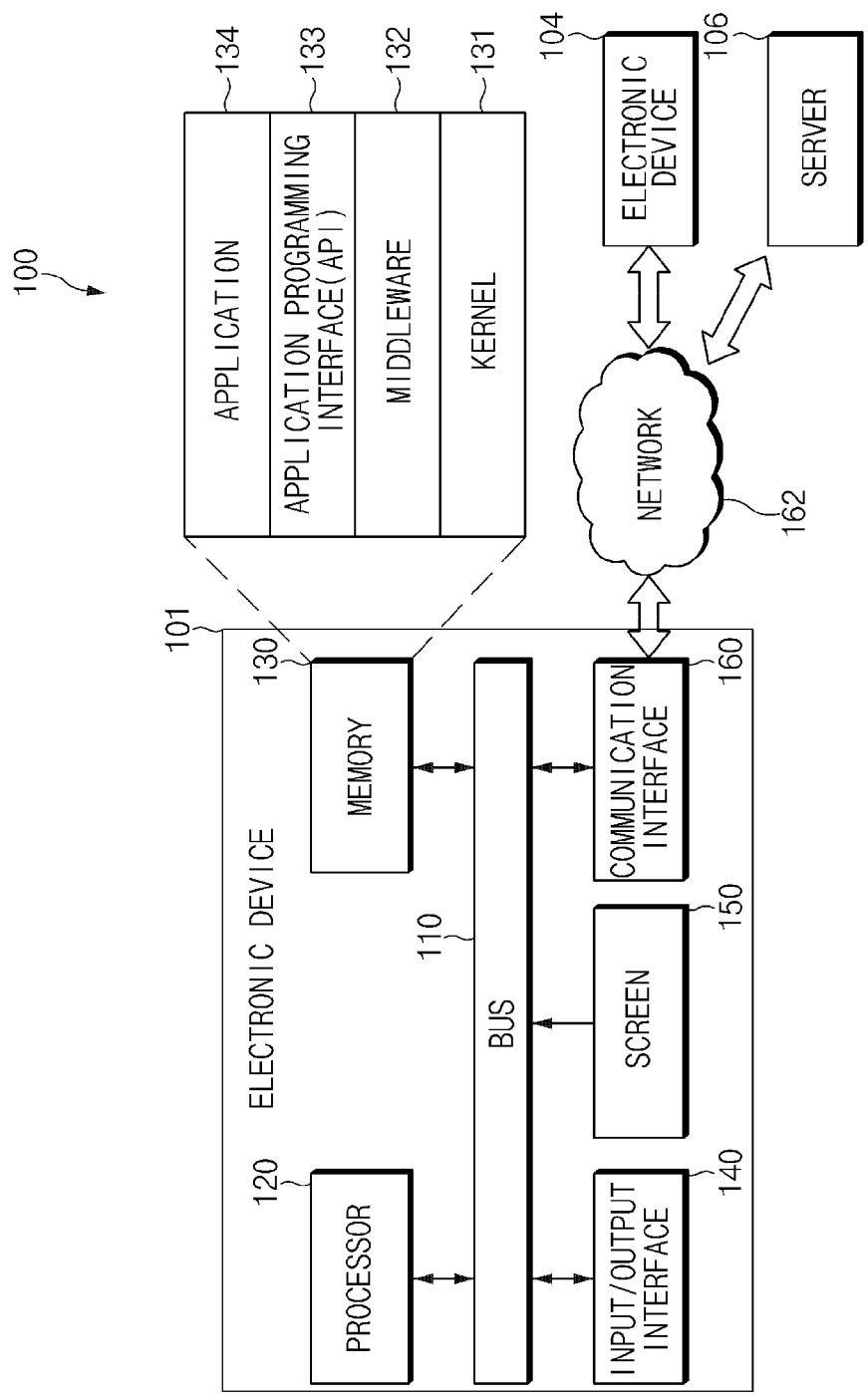
FIG. 1 illustrates a network environment including an electronic device, according to an embodiment of the present disclosure.

Hereinafter, various embodiments of the present disclosure are described with reference to the accompanying drawings. Various modifications are possible in the various embodiments of the present disclosure and specific embodiments are illustrated in drawings and related detailed descriptions are listed. However, this does not limit the present disclosure to a specific embodiment and it should be understood that the present disclosure covers all modifications, equivalents, and/or replacements of this disclosure provided they come within the scope of the appended claims and their equivalents. With respect to the descriptions of the drawings, like reference numerals refer to like elements.

The terms "include," "comprise," "have", "may include," "may comprise" and "may have" used herein indicate disclosed functions, operations, or existence of elements, but do not exclude other functions, operations or elements. Additionally, the terms "include," "comprise," "including," and "comprising," specify a property, a region, a fixed number, a step, a process, an element and/or a component, but do not exclude other properties, regions, fixed numbers, steps, processes, elements and/or components.

In an embodiment of the present disclosure, expressions "A or B" and "at least one of A or/and B" may include all possible combinations of items listed together. For instance, the expression "A or B", and "at least one of A or/and B" may include A, B, or both A and B.

The terms "1st", "2nd", "first", "second", etc., used herein may modify various elements of the present disclosure, but do not limit the elements. For instance, such expressions do not limit the order and/or importance of corresponding components. The expressions may be used to distinguish one element from another element. For instance, both "a first electronic device" and "a second electronic device" are all electronic devices and indicate different electronic devices. For example, a first component may be referred to as a second component and vice versa without departing from the scope of the present disclosure.

Herein, when one part (or element, device, etc.) is referred to as being "connected" to another part (or element, device, etc.), it should be understood that the former can be "directly connected" to the latter, or "connected" to the latter via an intervening part (or element, device, etc.). In contrast, when an element is referred to as being "directly connected" or "directly coupled" to another element, there are no intervening elements present.

The terms used herein are used to describe specific embodiments, and are not intended to limit the scope of the present disclosure. The terms of a singular form may include plural forms unless they have a clearly different meaning in the context.

Unless otherwise indicated herein, all the terms used herein, which include technical or scientific terms, have meanings that are generally understood by a person skilled in the art to which the present disclosure pertains. In general, such terms, as those defined in a dictionary, should be interpreted to have meanings equivalent to the contextual meanings in the related art, and, unless clearly defined herein, should not be interpreted abnormally or as having an excessively formal meaning.

Examples of electronic devices according to embodiments of the present disclosure may include smartphones, tablet personal computers (PCs), mobile phones, video phones, electronic book (e-book) readers, desktop Personal Computers (PCs), laptop Personal Computers (PCs), netbook computers, Personal Digital Assistants (PDAs), Portable Multimedia Player (PMPs), MP3 players, mobile medical devices, cameras, and wearable devices (for example, Head-Mounted-Devices (HMDs), such as electronic glasses, electronic apparel, electronic bracelets, electronic necklaces, electronic appcessories, electronic tattoos, and smart watches).

Additional Examples of electronic devices according to embodiments of the present disclosure include smart home appliances, such as televisions, Digital Video Disk (DVD) players, audio players, refrigerators, air conditioners, cleaners, ovens, microwave ovens, washing machines, air cleaners, set-top boxes, TV boxes (for example, Samsung HomeSync™, Apple TV™ or Google TV™), game consoles, electronic dictionaries, electronic keys, camcorders, and electronic picture frames.

Additional Examples of electronic devices according to embodiments of the present disclosure include various medical devices (for example, Magnetic Resonance Angiography (MRA) devices, Magnetic Resonance Imaging (MRI) devices, Computed Tomography (CT) devices, medical imaging devices, ultrasonic devices, etc.), navigation devices, Global Positioning System (GPS) receivers, Event Data Recorders (EDRs), Flight Data Recorders (FDRs), vehicle infotainment devices, marine electronic equipment (for example, marine navigation systems, gyro compasses, etc.), avionics, security equipment, vehicle head modules, industrial or household robots, Automatic Teller Machines (ATMs), and Point Of Sale (POS) machines.

Another example of an electronic device according to an embodiment of the present disclosure include at least one of part of furniture or buildings/structures supporting call forwarding service, electronic boards, electronic signature receiving devices, projectors, and various measuring instruments (for example, water, electricity, gas, or radio signal measuring instruments).

Additionally, an electronic device may be a combination of one of the above-mentioned various devices.

Further, an electronic device may be a flexible device.

Furthermore, it should be apparent to those skilled in the art that an electronic device, according to various embodiments of the present disclosure, is not limited to the above-mentioned devices.

Herein, the term "user" may refer to a person using an electronic device or a device using an electronic device (for example, an artificial intelligent electronic device).

FIG. 1 illustrates a network environment including an electronic device, according to an embodiment of the present disclosure.

Referring to FIG. 1, network environment 101, including electronic device 101 is provided. The electronic device 101 includes a bus 110, a processor 120, a memory 130, an input/output interface 140, a screen 150, and a communication interface 160.

The bus 110 is a circuit connecting the above-mentioned components to each other and delivering a communication (for example, a control message) between the above-mentioned components.

The processor 120 receives instructions from the above-mentioned other components (i.e., the memory 130, the input/output interface 140, the screen 150, and the communication interface 160) through the bus 110, interprets the received instructions, and executes a calculation or data processing according to the interpreted instructions.

The memory 130 stores instructions or data received from the processor 120 or other components (i.e., the input/output interface 140, the screen 150, and the communication interface 160) or generated by the processor 120 or the other components. The memory 130 includes programming modules such as a kernel 131, a middleware 132, an Application Programming Interface (API) 133, or an application 134. Each of the above-mentioned programming modules may be configured with software, firmware, hardware, or a combination of at least two thereof.

The kernel 131 controls or manages system resources (i.e., the bus 110, the processor 120, and the memory 130) used for performing operations or functions implemented in the remaining other programming modules, i.e., the middleware 132, the API 133, or the application 134. Additionally, the kernel 131 may provide an interface for performing a controlling or managing operation by accessing an individual component of the electronic device 101 from the middleware 132, the API 133, or the application 134.

The middleware 132 serves as an intermediary for exchanging data as the API 133 or the application 134 communicates with the kernel 131. Additionally, in relation to job requests received from the application 134, the middleware 132, controls (for example, scheduling or load balancing) the job requests by using a method of assigning a priority for using a system resource (i.e., the bus 110, the processor 120, and the memory 130) of the electronic device 101 to at least one application 134.

The API 133 is an interface for allowing the application 134 to control a function provided from the kernel 131 or the middleware 132, and may include at least one interface or function (for example, an instruction) for file control, window control, image processing, or character control.

The application 134 may include message applications (for example, Short Message Service (SMS)/Multimedia Messaging Service (MMS) applications), e-mail applications, calendar applications, notification applications, health care applications (for example, applications for measuring an amount of exercise or blood glucose levels), or environmental information applications (for example, applications for providing pressure, humidity, or temperature information). Additionally or alternatively, the application 134 may be an application relating to an information exchange between the electronic device 101 and an external electronic device 104 or a server 106. The information exchange related application may include a notification relay application for relaying specific information to the external electronic device 104 or server 106 or a device management application for managing the external electronic device 104 or server 106.

For example, the notification relay application relays to an external electronic device 104 notification information occurring from another application (for example, an SMS/MMS application, an e-mail application, a health care application, or an environmental information providing application) of the electronic device 101. Additionally or alternatively, the notification relay application receives notification information from the external electronic device 104 and may then provide the received notification information to a user.

The device management application manages (for example, installs, deletes, or updates) at least part of function (turn on/turn off of the external electronic device 104 (or some components of the external electronic device 104) or the brightness (or resolution) adjustment of a display) of an external electronic device 104 communicating with the electronic device 101, an application operating in the external electronic device 104, or a service (for example, a call service or message service) provided from the external electronic device 104.

The application 134 may include an application based on a property (for example, the type of an electronic device) of the external electronic device 104. For example, when an external electronic device 104 is an MP3 player, the application 134 may include an application relating to music playback. Similarly, when an external electronic device 104 is a mobile medical device, the application 134 includes an application relating to heath care. The application 134 may include at least one of an application assigned to the electronic device 101 and an application received from an external electronic device 104.

The input/output interface 140 delivers an instruction or data inputted from a user through an input/output device (for example, a sensor, a keyboard, or a touch screen) to the processor 120, the memory 130, or the communication interface 160 through the bus 110. For example, the input/output interface 140 provides, to the processor 120, data on a user's touch inputted through a touch screen. Additionally, the input/output interface 140 outputs, through the input/output device (for example, a speaker or a display), instructions or data received from the processor 120, the memory 130, or the communication interface 160 through the bus 110. For example, the input/output interface 140 may output voice data processed through the processor 120 to a user through a speaker.

The screen 150 displays various types of information (for example, multimedia data or text data) to a user.

The communication interface 160 connects a communication between the electronic device 101 and the electronic device 104 or the server 106. For example, the communication interface 160 may communicate with the external electronic device 104 connected to the network 162 through wireless communication or wired communication.

The wireless communication, for example, includes at least one of WiFi, Bluetooth (BT), Near Field Communication (NFC), GPS, and cellular communication (for example, 3G, Long Term Evolution (LTE), LTE-Advanced (LTE-A), Code Division Multiple Access (CDMA), Wideband CDMA (WCDMA), Universal Mobile Telecommunications System (UMTS), Wideband Broadband (WiBro), or Global System for Mobile (GSM) communication).

The wired communication, for example, includes at least one of Universal Serial Bus (USB), High Definition Multimedia Interface (HDMI), Recommended Standard 232 (RS-232), and Plain Old Telephone Service (POTS).

The network 162 is telecommunications network. The telecommunications network includes at least one of computer network, Internet, Internet of Things, and telephone network. A protocol (for example, transport layer protocol, data link layer protocol, or physical layer protocol) for communication between the electronic device 101 and the external electronic device 104 may be supported by at least one of the application 134, the application programming interface 133, the middleware 132, the kernel 131, and the communication interface 160.

The server 106 may support the driving of the electronic device 101 by performing at least one operation (or function) implemented by the electronic device 101. For example, the server 106 may include a server module capable of supporting the processor 120, which is implemented in the electronic device 101. For example, the server module, including at least one component of the processor 120, performs (for example, acts on behalf of the processor 120) at least one operation that the processor 120 performs.

Figure 2:
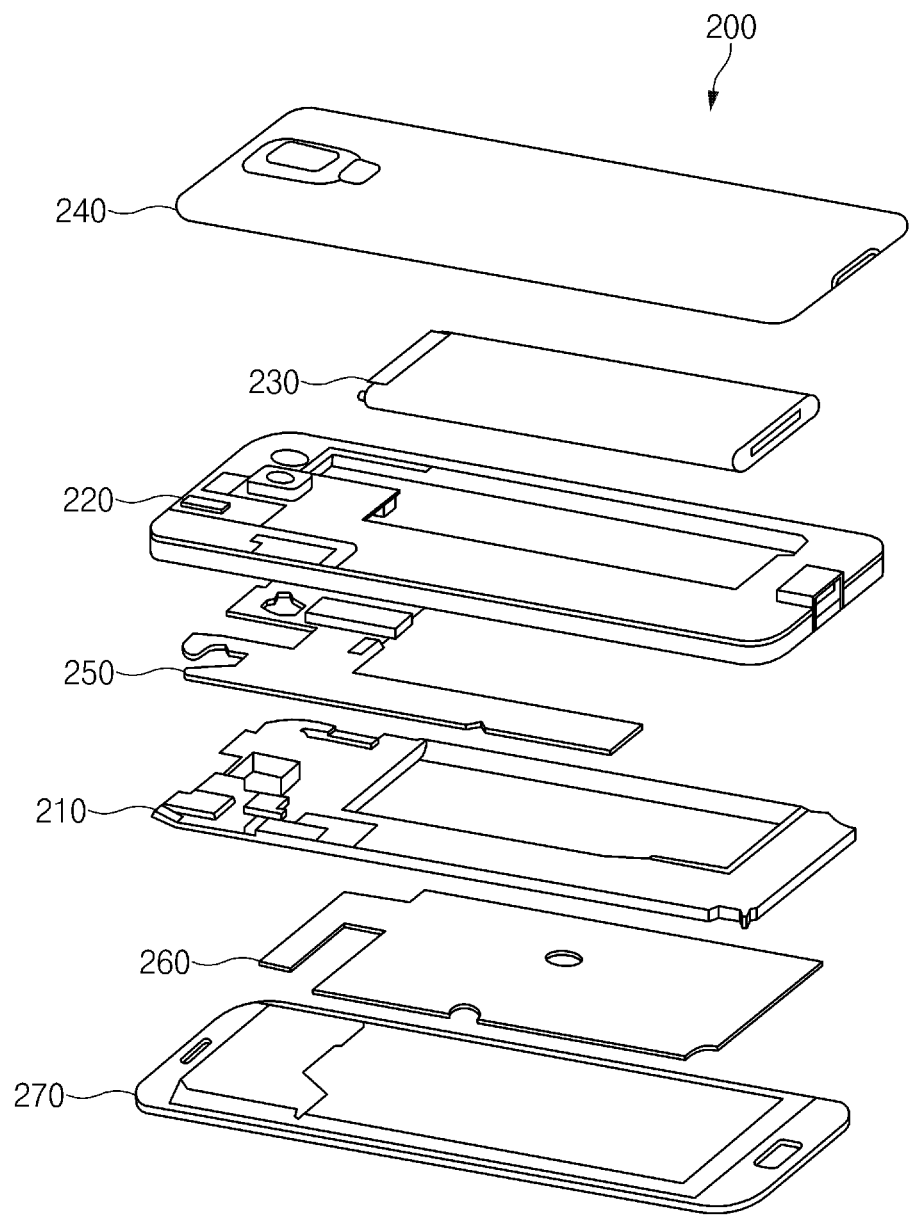
FIG. 2 is an exploded perspective back view of an electronic device, according to an embodiment of the present disclosure.

FIG. 2 is an exploded perspective back view of an electronic device, according to an embodiment of the present disclosure.

Referring to FIG. 2, the electronic device 200 is provided. The electronic device 200 includes a front case 210, a rear case 220, a battery 230 for supplying power, and a battery cover 240 disposed at the back surface of the rear case 220. The electronic device 200 further includes a Printed Circuit Board (PCB) 250 for mounting various electronic components between the front case 210 and the rear case 220, a heat dissipation plate 260, and a display panel 270 disposed at the front surface of the front case 210. The front case 210, the PCB 250, and the rear case 220 are coupled to each other in a vertically stacked structure to support the various electronic components.

Each of the front case 210 and the rear case 220 has a battery slot for disposing the battery 230. The battery 230 is mounted in the battery slot provided at each of the front case 210 and the rear case 220. Additionally, at least a part of the battery cover 240 is coupled to the rear case in order to prevent the detachment from the battery slot.

The PCB 250 includes a power connector to electrically connect the battery 230 to the PCB 250.

The electronic device 200 may include a partially modified configuration of that provided in FIG. 2. For example, as illustrated in FIG. 2, the battery slot of the front case 210 has an open slot which is closed by the heat dissipation plate 260 as a result of the coupling of the heat dissipation plate 260. However, the front case 210 may have a form in which a bottom surface of the battery slot itself is closed. Additionally, the heat dissipation plate 260 may be omitted from the electronic device 200. Hereinafter, it is described that the battery slot of the front case 210 has a closed bottom surface.

Figure 3:
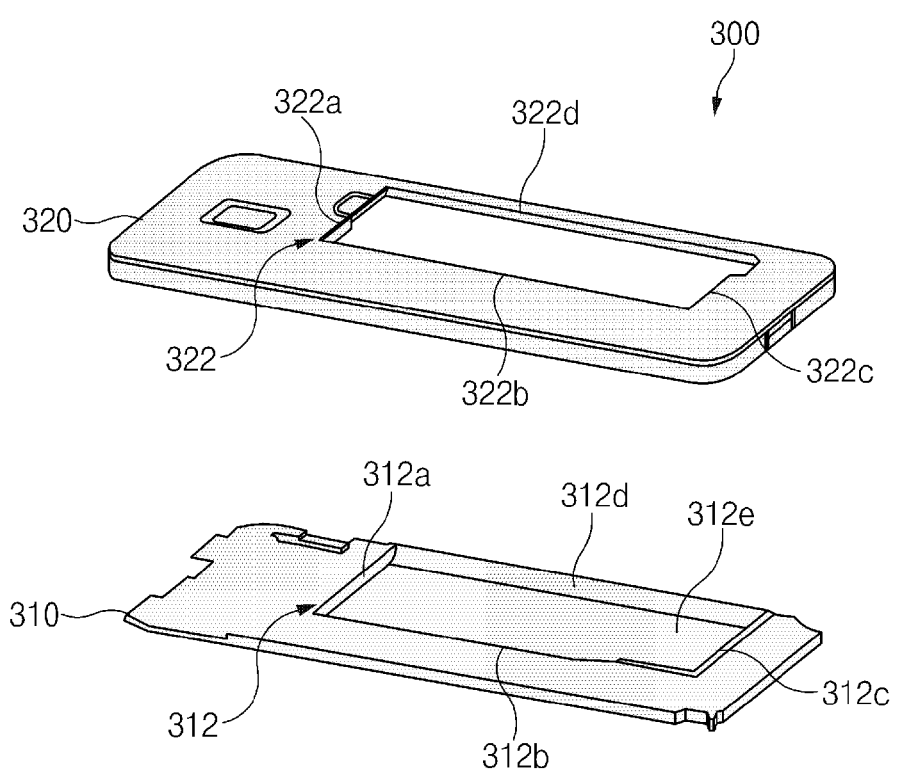
FIG. 3 is an enlarged perspective view of a front case and a rear case of an electronic device, according to an embodiment of the present disclosure.

FIG. 3 is an enlarged perspective view of a front case and a rear case of an electronic device, according to an embodiment of the present disclosure.

Referring to FIG. 3, a front case 310 of electronic device 300 is provided. The front case 310 includes a first battery slot 312. The first battery slot 312 includes sidewalls 312a to 312d and bottom surface 312e. The first sidewall 312a and the third sidewall 312c face each other and the second sidewall 312b and the fourth sidewall 312d face each other. The sidewalls 312a to 312d prevent a battery 230 seated in the first battery slot 312 from moving on the same plane. Additionally, the bottom surface 312e supports the battery 230 in the direction of the rear case 320. Accordingly, the bottom surface 312e protects a display panel of the electronic device 300, by using the battery 230, from a force applied from the direction of the display panel, from an impact that the electronic device 300 receives from the outside.

The rear case 320 includes a second battery slot 322. The second battery slot 322 includes sidewalls 322a to 322d. The fifth sidewall 322a and the sixth sidewall 322c face each other and the seventh sidewall 322b and the eighth sidewall 322d face each other.

The front case 310 and the rear case 320 are stacked to align the first battery slot 312 and the second battery slot 322. Accordingly, when the first battery slot 312 and the second battery slot 322 are aligned, the first sidewall 312a and the fifth sidewall 322a, the second sidewall 312b and the sixth sidewall 322b, the third sidewall 312c and the seventh sidewall 322c, and the fourth sidewall 312d and the eighth sidewall 322d are disposed to be adjacent to each other.

The height of the battery 230 may be higher than the height of the sidewalls 312a to 312d. Accordingly, when the battery 230 is seated in the first battery slot 312, a part of the battery 230 may protrude above the first battery slot 312. In this case, the protruded part of the battery 230 is prevented from shaking on the same plane by the second battery slot 322 included in the rear case 320. The sidewalls 322a to 322d of the second battery slot 322 are formed to surround the circumference of the partially protruded part of the battery 230.

Figure 4A:
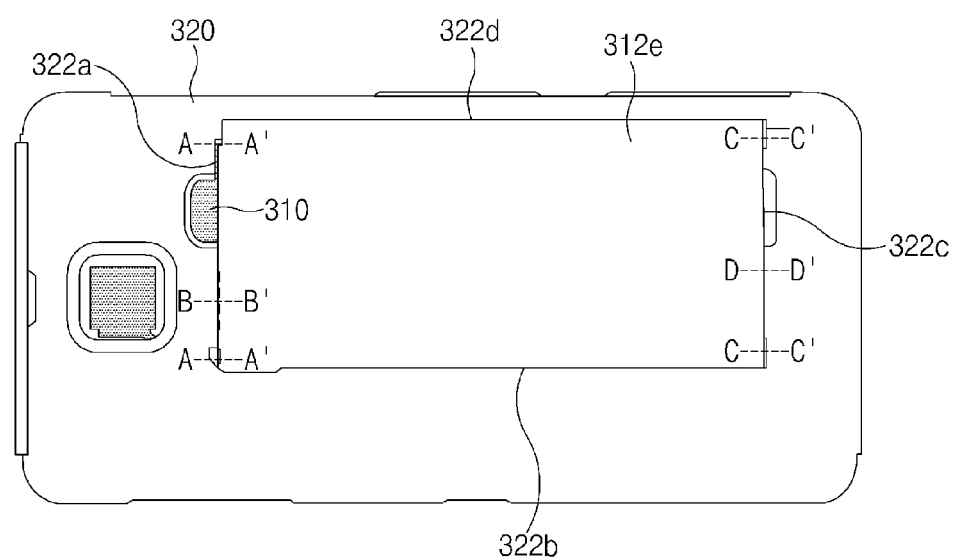
FIG. 4A is a back view of an electronic device in which a front case and a rear case are coupled to each other, according to an embodiment of the present disclosure.

FIG. 4A is a back view of an electronic device in which a front case and a rear case are coupled to each other, according to an embodiment of the present disclosure.

Referring to FIG. 4A, the rear case 320, the fifth sidewall 322a, the sixth sidewall 322b, the seventh sidewall 322c, and the eighth sidewall 322d are illustrated. Since the front case 310 is stacked below the rear case 320, only a partial view of the front case 310 is shown in FIG. 4A. The first sidewall 312a, the second sidewall 312b, the third sidewall 312c, and the fourth sidewall 312d of the front case 310, are disposed at the respective positions corresponding to the fifth sidewall 322a, the sixth sidewall 322b, the seventh sidewall 322c, and the eighth sidewall 322d of the rear case 320.

FIGS. 4B to 4E are partial sectional back views of an electronic device in which a front case and a rear case are coupled to each other, according to an embodiment of the present disclosure.

Referring to FIGS. 4B to 4E, sectional structures taken along lines A-A', B-B', C-C', and D-D' of FIG. 4A are illustrated.

Figure 4B:
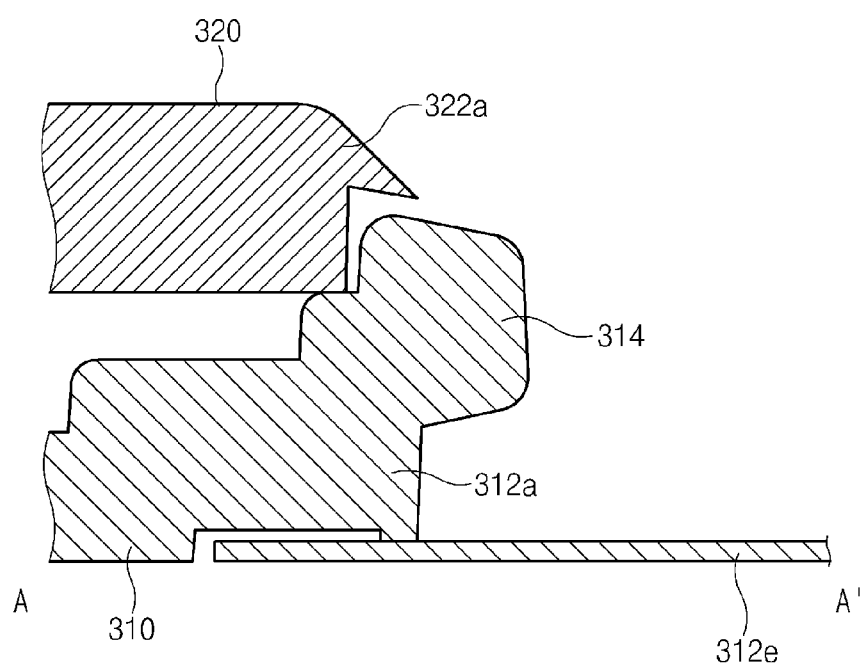
FIGS. 4B to 4E are partial sectional back views of an electronic device in which a front case and a rear case are coupled to each other, according to an embodiment of the present disclosure.

FIG. 4B is a sectional view taken along the line A-A' of the view illustrated in FIG. 4A. As illustrated in FIG. 4B, the rear case 320 is stacked on the front case 310. A PCB 350 may be disposed in an empty space between the front case 310 and the rear case 320.

A first protruding part 314 is protruded at the first sidewall 312a of the front case 310. However, the first protruding part 314 may extend from the fifth sidewall 322a of the rear case 320 instead of the front case 310.

Figure 4C:
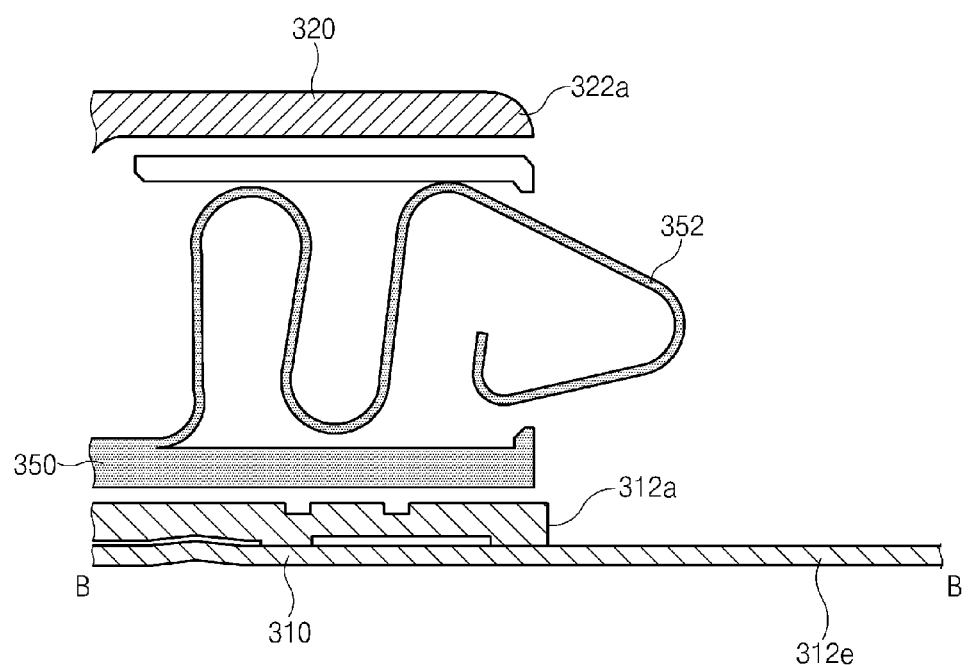

FIG. 4C is a sectional view taken along the line B-B' of the view illustrated in FIG. 4A As illustrated in FIG. 4C, a PCB 350 is stacked on the front case 310 and the rear case 320 is stacked on the PCB 350.

The PCB 350 includes a power connector 352. The power connector 352 protrudes toward the third sidewall 312c and the seventh sidewall 322c, based on the first sidewall 312a and the fifth sidewall 322a, in order to contact the battery 230 to be seated in the first battery slot 312.

However, when the battery 230 includes a protruding part protruding toward the power connector 352, the power connector 352 may not be protruded based on the first sidewall 312a and the fifth sidewall 322a.

Although it is illustrated that the power connector 352 is disposed between the front case 310 and the rear case 320, the power connector 352 may be inserted to the middle of the front case 310 or the middle of the rear case 320.

Figure 4D:
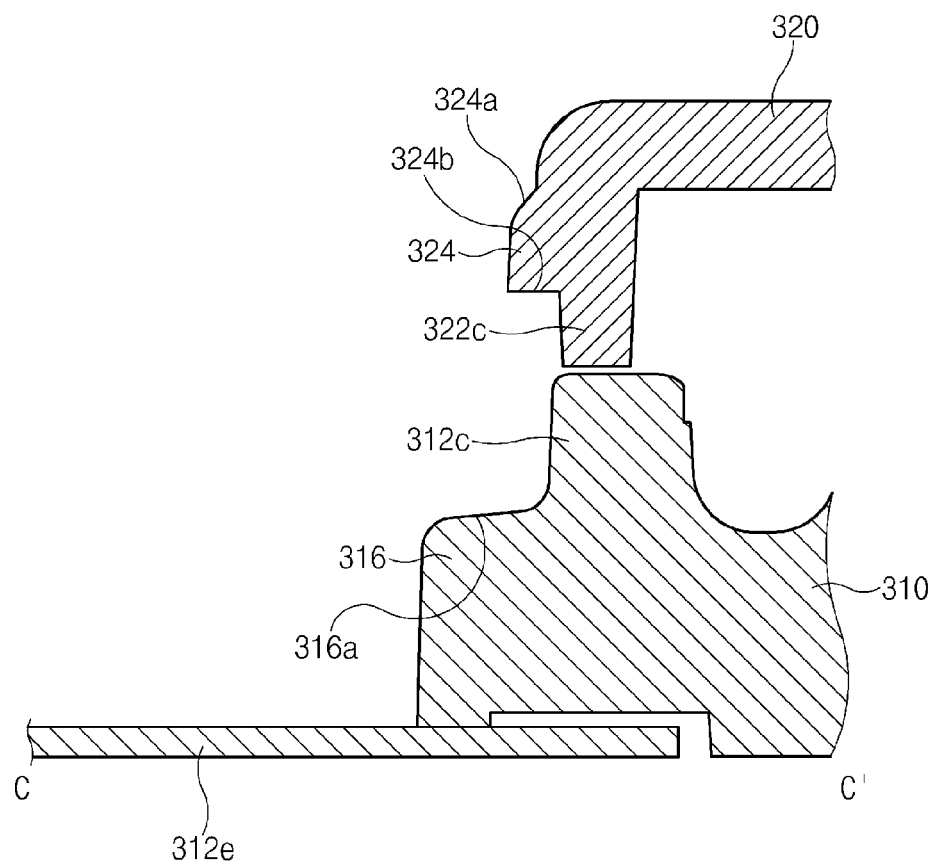

FIG. 4D is a sectional view taken along the line C-C' of the view illustrated in FIG. 4A. As illustrated in FIG. 4D, the rear case 320 is stacked on the front case 310.

The front case 310 includes a second protruding part 316 protruding from the third sidewall 312c. In this case, the second protruding part 316 is disposed between the bottom surface 312e and the third sidewall 312c.

Additionally, the rear case 320 includes a protruding part 324 protruding from the seventh sidewall 322c. A first end 324a of the protruding part 324 may have a predetermined tilt angle and may extend from the seventh sidewall 322c. Additionally, a second end 324b of the protruding part 324 is formed to be vertical to the sidewall 322c.

Figure 4E:
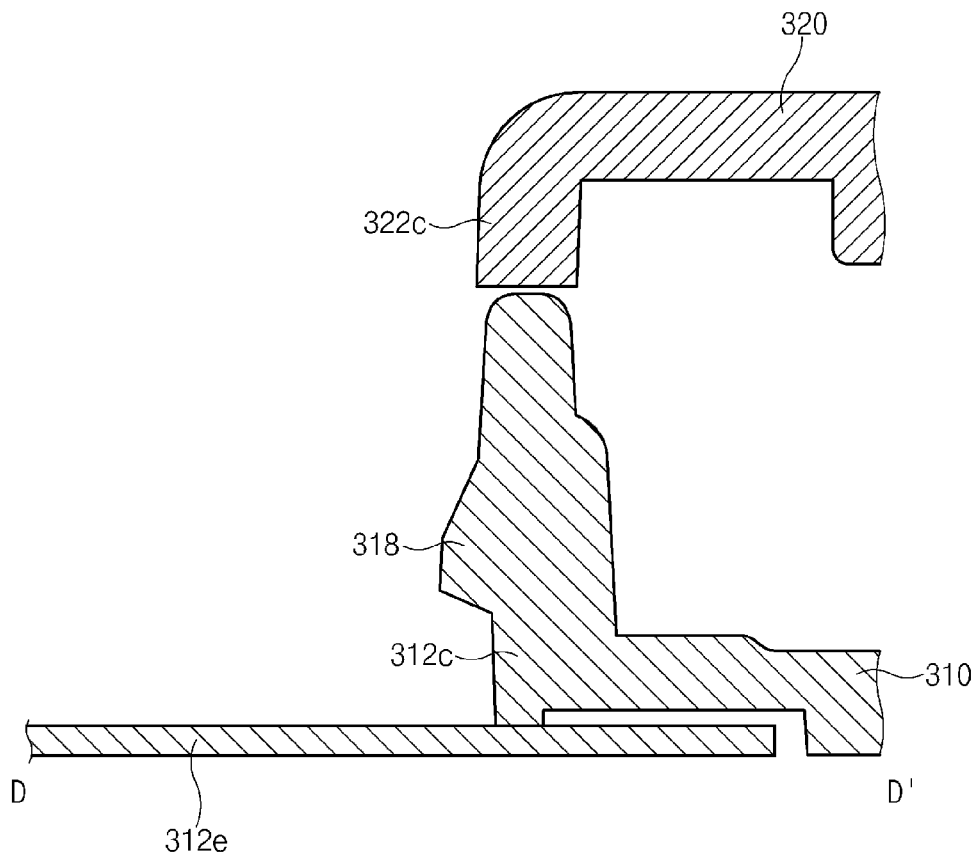

FIG. 4E is a sectional view taken along the line D-D' of the view illustrated in FIG. 4A. As illustrated in FIG. 4E, the rear case 320 is stacked on the front case 310.

The front case 310 includes a third protruding part 318 protruding from the third sidewall 312c. The protruding part 318 is formed to correspond to one surface of a battery 230 corresponding to the third sidewall 312c. For example, the protruding part 318 is protruded at a predetermined height from the bottom surface 312e. Additionally, the protruding part 318 is disposed to be spaced a predetermined distance from the top end of the first battery slot 312.

Figure 5A:
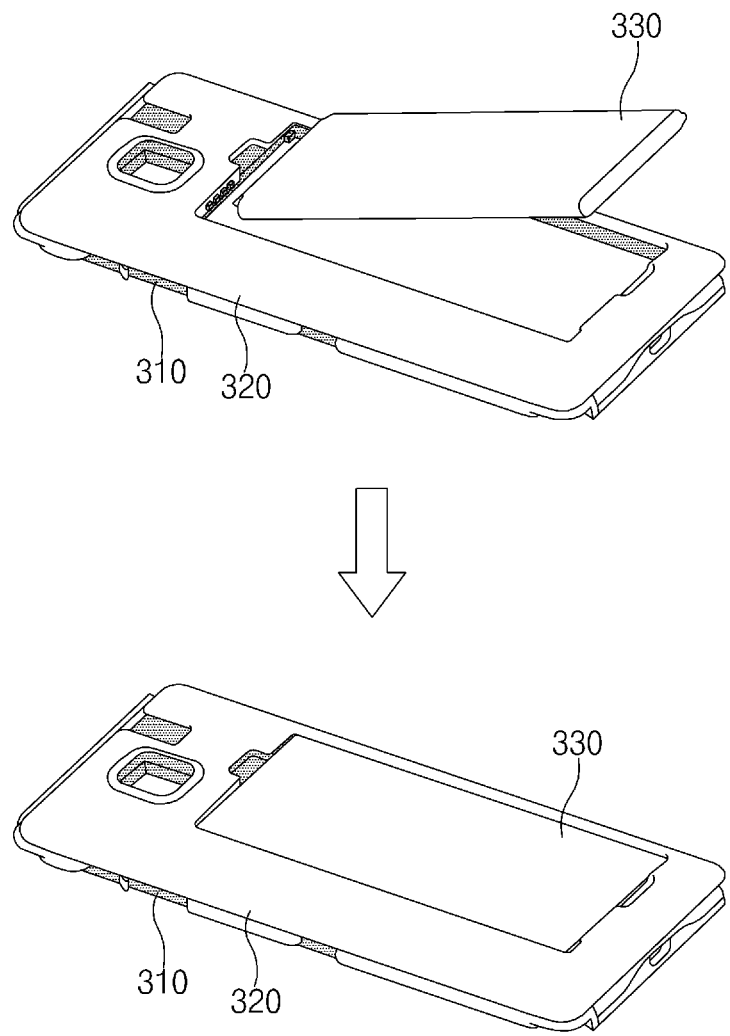
FIG. 5A is a view illustrating an operation of inserting a battery into a battery slot of an electronic device, an embodiment of the present disclosure.
Figure 5B:
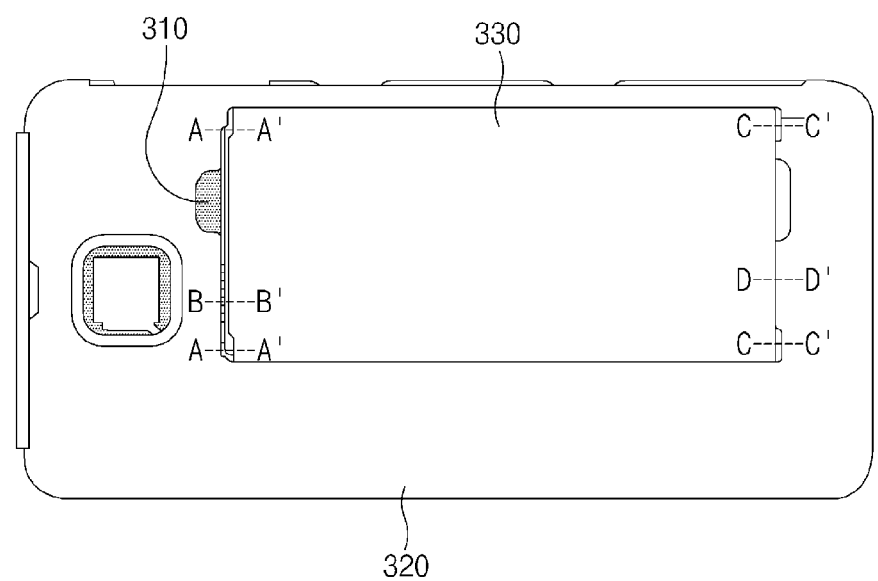
FIG. 5B is a back view of an electronic device having a battery seated in a battery slot of the electronic device, according to an embodiment of the present disclosure.

FIG. 5A is a view illustrating an operation of inserting a battery in a battery slot of an electronic device, according to an embodiment of the present disclosure. FIG. 5B is a back view of an electronic device having a battery seated in a battery slot of the electronic device, according to an embodiment of the present disclosure Referring to FIG. 5A, a front case 310 and a rear case 320 of the electronic device 300 is illustrated. As mentioned above, the first protruding part 314 included in the front case 310 is protruded in the direction of the first battery slot 312. Also, the power connector 352 is protruded in the direction of the first battery slot 312 between the front case 310 and the rear case 320. Accordingly, the battery 330 is inserted in the first battery slot 312 in a manner such that one surface of the battery 330 is first fixed toward the first sidewall 312a and the fifth sidewall 322a and then, the other surface of the battery 330 is pressed toward the third sidewall 312c and the seventh sidewall 322c.

The length of at least one side of the first battery slot 312 is longer than that of one side of the battery 330. Additionally, back referring to FIG. 4C, the power connector 352 has a structure for providing elastic force. Accordingly, the power connector 352 pushes the battery 330 seated in the first battery slot 312 toward the direction of the third sidewall 312c and the seventh sidewall 322c. By the elastic force provided from the power connector 352, the battery 330 is pressed against the third sidewall 312c and the seventh sidewall 322c.

Referring to FIG. 5B, the battery 230 is shown seated in the first battery slot 312.

FIGS. 5C to 5F are partial sectional back views of an electronic device having a battery seated in a battery slot of the electronic device, according to an embodiment of the present disclosure.

Referring to FIGS. 5C to 5F, sectional structures taken along lines A-A', B-B', C-C', and D-D' of FIG. 5B are illustrated.

FIGS. 5C to 5F correspond to FIGS. 4B to 4E, respectively, and among the content described with reference to FIGS. 4B to 4E, content redundantly applied to FIGS. 5C to 5F is not described.

Figure 5C:
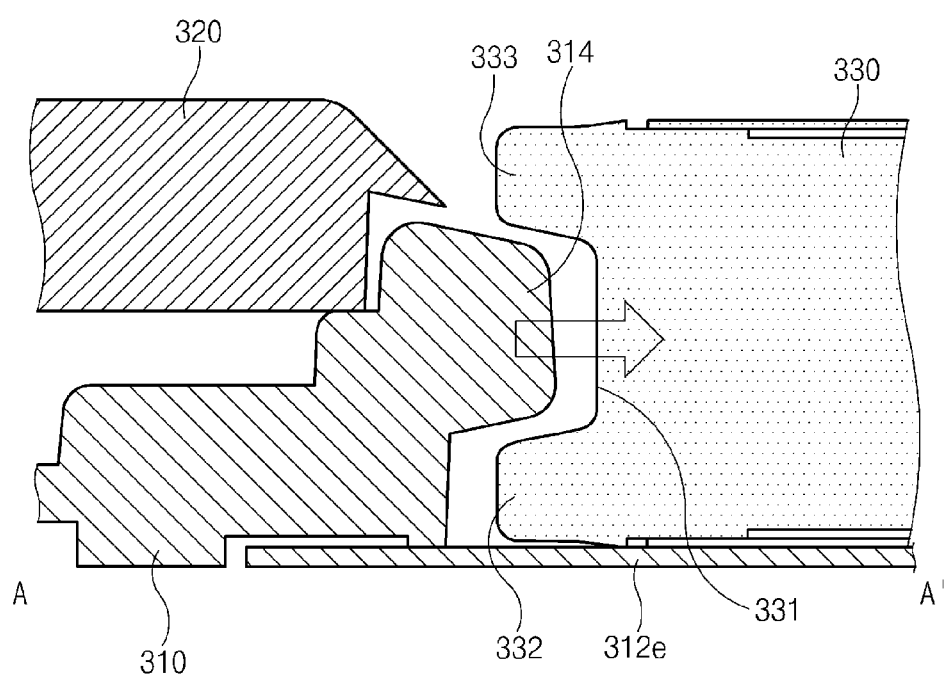
FIGS. 5C to 5F are partial sectional back views of an electronic device having a battery seated in a battery slot of the electronic device, according to an embodiment of the present disclosure.

FIG. 5C is a sectional view taken along the line A-A' of the view illustrated in FIG. 5B. As illustrated in FIG. 5C, the battery 330 includes a groove 331 corresponding to the first protruding part 314 of the front case 310. The battery 330 includes first protruding parts 332 and 333, extending in the direction of the first sidewall 312a and the fifth sidewall 322a, in a form which engages the first protruding part 314 of the front case 310.

The battery 330 is pushed in the direction of the third sidewall 312c and the seventh sidewall 322c by the power connector 352 to be spaced apart from the first sidewall 312a and the fifth sidewall 322a. Although the space is formed, the first protruding part 314 of the front case 310 supports the battery 330 seated in the first battery slot 312, so that the battery 330 does not fall out. Because, the spaced is shorter than the length of the first protruding parts 332 and 333 of the battery 330. For example, as the first protruding part 314 of the front case 310 is caught by the first protruding parts 332 and 333 of the battery 330 by external force, the battery 330 is prevented from being shaken in the direction of the bottom surface 312e or in an opposite direction.

Figure 5D:
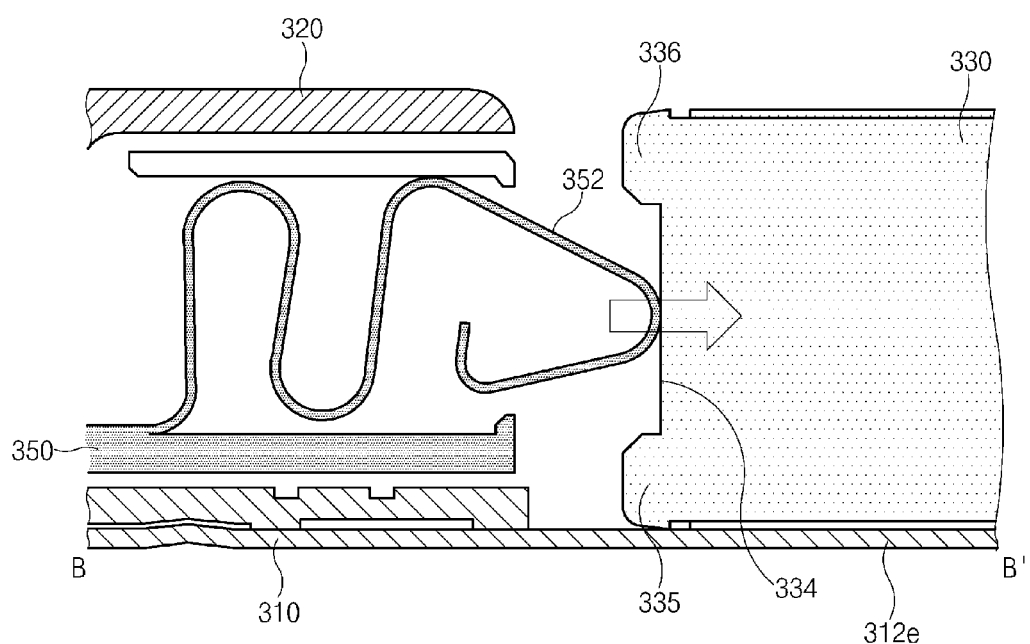

FIG. 5D is a sectional view taken along the line B-B' of the view illustrated in FIG. 5B according to an embodiment of the present disclosure.

As illustrated in FIG. 5D, the battery 330 includes a terminal 334 contacting the power connector 352 and second protruding parts 335 and 336. The power connector 352 receives power for driving the electronic device 300 from the battery 330. Accordingly, the power connector 352 is formed of a conductive material. Similarly, the terminal 334 contacting the power connector 352 is also formed of a conductive material.

When the battery 330 is shaken in the direction of the bottom surface 312e or in an opposite direction, the second protruding parts 335 and 336 of the battery 330 prevent the power connector 352 from being detached from the terminal 334. Accordingly, a powering off of the electronic device 300 as a result of the power connector 352 being detached from the terminal 334 is prevented.

The power connector 352 is formed for providing elastic force. Accordingly, the power connector 352 pushes the battery 330 in the direction of the third sidewall 312c and the seventh sidewall 322c.

The sum of the length of the power connector 352 and the length of the surface of the battery 330 corresponding to the second sidewall 312b and the fourth sidewall 312d is longer than the length of the second sidewall 312b and the fourth sidewall 312d. Additionally, the length of the surface of the battery 330 corresponding to the second sidewall 312b and the fourth sidewall 312d is shorter than the length of the second sidewall 312b and the fourth sidewall 312d. Accordingly, the power connector 352 is somewhat compressed but the second protruding parts 335 and 336 of the battery 330 are spaced from the first sidewall 312a and the fifth sidewall 322a. However, although the second protruding parts 335 and 336 of the battery 330 are spaced from the first sidewall 312a and the fifth sidewall 322a, the power connector 352 maintains contact with the terminal 334.

Figure 5E:
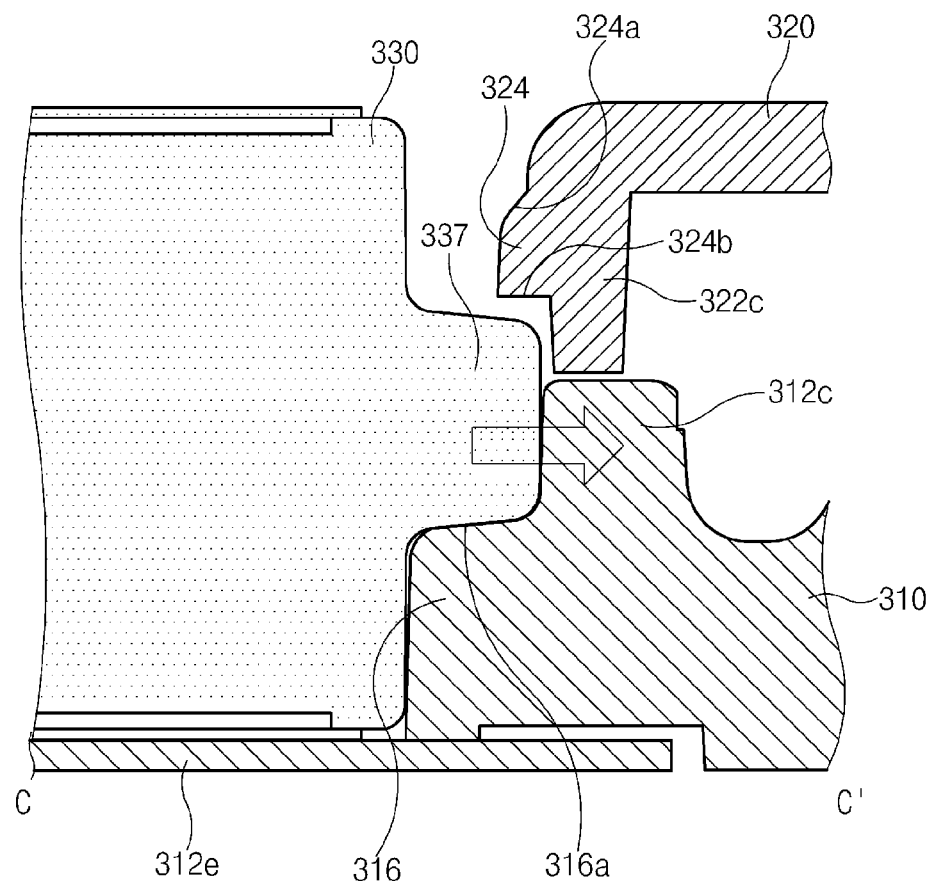

FIG. 5E is a sectional view taken along the line C-C' of the view illustrated in FIG. 5B. As shown in FIG. 5E, the battery 330 includes a third protruding part 337.

The second protruding part 316 of the front case 310 supports the battery 330 in the direction of the rear case 320. For example, in relation to the battery 330, the third protruding part 337 is disposed at the surface of the battery 330 corresponding to the third sidewall 312c and the third protruding part 337 of the battery 330 is seated on an end 316a of the second protruding part 316 of the front case 310.

Accordingly, when there is impact from the outside of an electronic device 300, the second protruding part 316 of the front case 310 absorbs a force applied toward a display panel of the electronic device 300 to protect the display panel.

Additionally, since a first end 324a of the protruding part 324 has a predetermined tilt angle, the third protruding part 337 of the battery 330 may be inserted into the first battery slot 312 by sliding the third protruding part 337 down the first end 324a of the protruding part 324.

The second end 324b of the protruding part 324 is formed to be vertical to the sidewall 322c. The second end 324b of the protruding part 324 prevents the battery 330 from being lifted in the direction of the rear case 320.

The second protruding part 316 of the front case 310 and the protruding part 324 of the rear case 330, are disposed in parallel on the same axis. In this case, the second protruding part 316 of the front case 310 and the protruding part 324 of the rear case 320 engage with each other to secure the third protruding part 337 of the battery 330. The second protruding part 316 of the front case 310 and the protruding part 324 of the rear case 320 may be alternately disposed in a zigzag form at the third sidewall 312c and the seventh sidewall 322c, respectively.

Figure 5F:
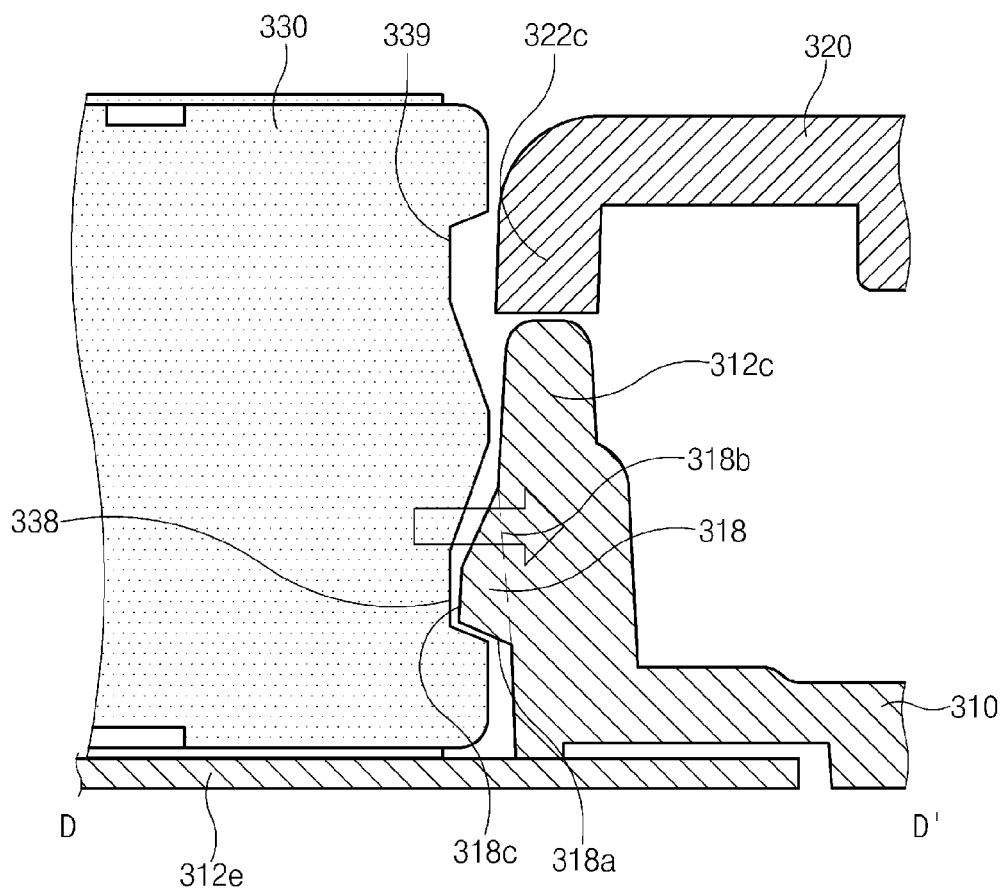

FIG. 5F is a sectional view taken along the line D-D' of the view illustrated in FIG. 5B.

As shown in FIG. 5F, a third protruding part 318 of the first battery slot 312 has a form corresponding to a nail groove 338 disposed at one surface of the battery 330. Accordingly, a first end 318a of the third protruding part 318 extends with a predetermined tile angle in the direction of an upper end 318c of the third protruding part 318 from a surface 318b (for example, on the same line as the third sidewall 312c) of the protruding part 318. When the first end 318a of the third protruding part 318 extends with a predetermined tile angle, the third protruding part 318 allows a user to easily detach the battery 330 from the first battery slot 312. When the first end 318a of the third protruding part 318 extends vertically, the third protruding part 318 prevents the battery 330 from unintentionally being lifted from the first battery slot 312 toward the rear case 320.

The rear case 320 may additionally includes a protruding part having a form corresponding to the nail groove 339 at the seventh sidewall 322c.

Figure 6A:
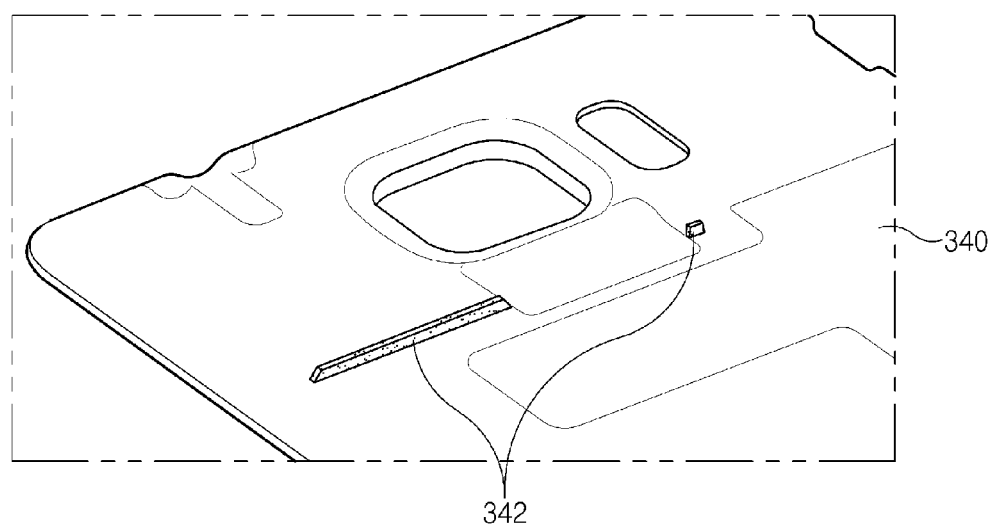
FIG. 6A is a partial view of an inner surface of a battery cover, according to an embodiment of the present disclosure.

FIG. 6A is a partial view of an inner surface of a battery cover, according to an embodiment of the present disclosure.

Referring to FIG. 6A, a battery cover 340 includes a protruding part 342 protruding on an inside surface in one direction. The protruding part 342 is disposed at a sidewall of the second battery slot 322 when the rear case 320 and the battery cover 340 are coupled to each other. Hereinafter, the protruding part 342 is described with reference to FIG. 6B.

Figure 6B:
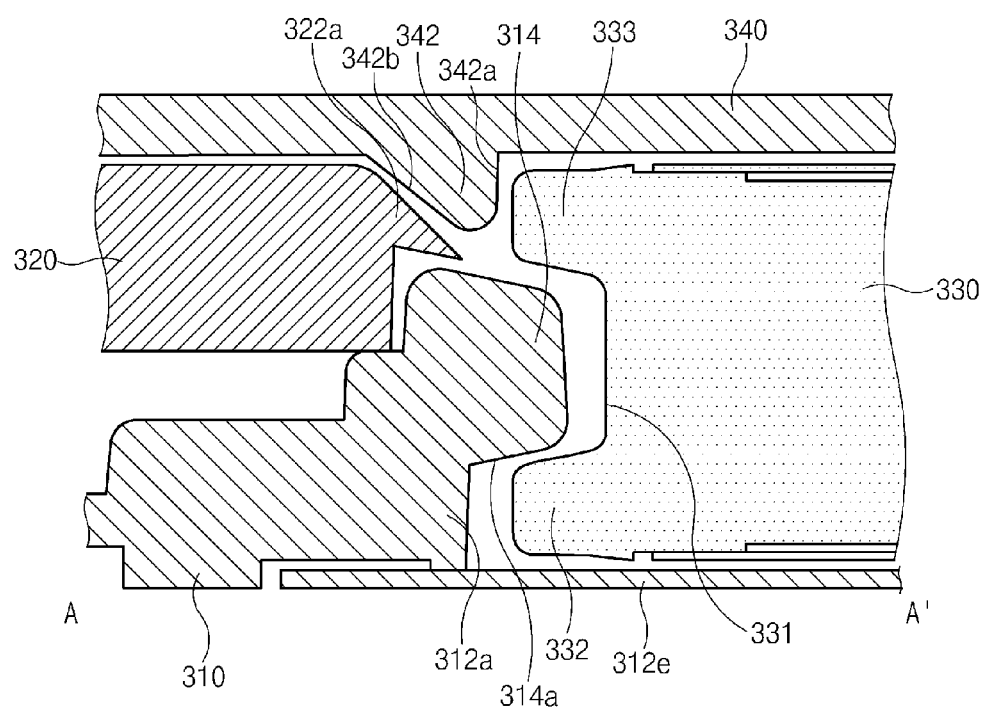
FIG. 6B is a partial sectional view of an electronic device where a battery cover is coupled according to an embodiment of the present disclosure.

FIG. 6B is a partial sectional view of an electronic device where a battery cover is coupled, according to an embodiment of the present disclosure.

Referring to FIG. 6B, a sectional view taken along the line A-A' when the battery cover 340 is mounted at the rear case 320 as illustrated in FIG. 5C is provided.

The battery cover 340 is stacked on the rear case 320 and the battery 330. The battery cover 340 may not be simply disposed on the rear case 320 and the battery 330 but may be alternatively coupled with the rear case 320. For example, a hook disposed at least a part of the battery cover 340 may be coupled to a hole at the back surface of the rear case 320 disposed at a position corresponding to the hook. Accordingly, even if the battery 330 pushes the battery cover 340 in the back direction of an electronic device 300 by a force applied from the outside of the electronic device 300, the battery cover 340 will not be separated from the rear case 320 and will maintain the coupling with the rear case 320. That is, as the battery cover 340 is coupled to the rear case 320 through a coupling structure, this may prevent the battery 330 from being detached in the rear direction of the electronic device 300.

Additionally, the protruding part 342 of the battery cover 340 is disposed in a space between the fifth sidewall 322a and the battery 330, which are spaced apart from each other by the power connector 352. Accordingly, the protruding part 342 prevents the battery 330 from moving toward the first sidewall 312a and the fifth sidewall 322a. For example, if the electronic device 300 receives a force from the outside, at a side of the electronic device 300. The force is delivered to the battery 330 to allow the battery 330 to move in the direction of the first sidewall 312a and the fifth sidewall 322a.

If the battery cover 340 does not have the protruding part 342, the battery 330 may push the power connector 352, from the force, in the direction of the first sidewall 312a and the fifth sidewall 322a. In this case, the power connector 352 having a structure for providing elastic force is compressed by a pushing force of the battery 330. The reason is that the force of the battery 330 pushing the power connector 352 in the direction of the first sidewall 312a and the fifth sidewall 322a is greater than the force of the power connector 352 pushing the battery 330 in the direction of the third sidewall 312c and the seventh sidewall 322c. The power connector 352 is compressed to at least the same plane as the first sidewall 312a and the fifth sidewall 322a while the battery 330 is compressed to the first sidewall 312a and the fifth sidewall 322a. That is, groove 331 of the battery 330 may touch the first protruding part 314 of the front case 310 disposed at the first sidewall 312a, and the first protruding parts 332 and 333 of the battery 330 may respectively touch at least portions of the first sidewall 312a and the fifth sidewall 322a. Due to this, the third protruding part 337 of the battery 330, shown in FIG. 5E, is spaced a predetermined distance from the third sidewall 312c and the seventh sidewall 322c. The predetermined spaced distance of the third protruding part 337 of the battery 330 is longer than the length of the second end 324b of the protruding part 324 of the rear case 320. Accordingly, an end of the third protruding part 337 no longer faces the second end 324b of the protruding part 324 of the rear case 320. Due to this, when the battery 330 receives force in the direction of the battery cover 340, the third protruding part 337 may be released from the protruding part 324 of the rear case 320 and the protruding part 324 is unable to prevent the detachment of the battery 330 any more.

On the other hand, when the battery cover 340 has the protruding part 342, as the battery 330 receives a force that moves the battery 330 in the direction of the first sidewall 312a and the fifth sidewall 322a, the battery 330 pushes an end 342a of the protruding part 342 of the battery cover 340. Additionally, as mentioned above, at least a part of the battery cover 340 is coupled to the rear case 320 and is stacked on the rear case 320 and the battery 330. Accordingly, even when the battery 330 pushes the end 342a of the protruding part 342 of the battery cover 340, since the battery 340 is coupled to the rear case 320 in a fixed state, the protruding part 342 of the battery cover 340 is not be pushed toward the first sidewall 312a and the fifth sidewall 322a. Therefore, the third protruding part 337 of the battery 330 is spaced from the third sidewall 312c and the seventh sidewall 322c. In this case, even when the battery 330 receives force in the direction of the battery cover 340, the protruding part 324 of the rear case 320 supports the third protruding part 337 of the battery 330 in the direction of the bottom surface 312e, an end 314a of the first protruding part 314 of the front case 310 supports the first protruding part 332 of the battery 330 in the direction of the bottom surface 312e, and the battery cover 340 supports the battery 330 in the direction of the bottom surface 312e, thereby preventing a detachment of the battery 330.

Accordingly, the protruding part 342 of the battery cover 340 is disposed in a space between the spaced fifth sidewall 322a and battery 330, in order to prevent the detachment of the battery 330. Additionally, as shown in FIG. 6A, the protruding part 342 may be formed in an extended line form at the battery cover 340 but the present disclosure is not limited thereto, and the protruding part 342 may be formed in at least a form of a plurality of dots.

The other end 342b of the protruding part 342 adjacent to the fifth side wall 322a extends with a predetermined tilt from the battery cover 340 in correspondence to the form of the fifth sidewall 322a. Accordingly, if the fifth inner wall 322a does not have a predetermined tilt and has a form vertical to the rear case 320, the protruding part 342 of the battery cover 340 may also extend vertically from the battery cover 340.

Figure 7:
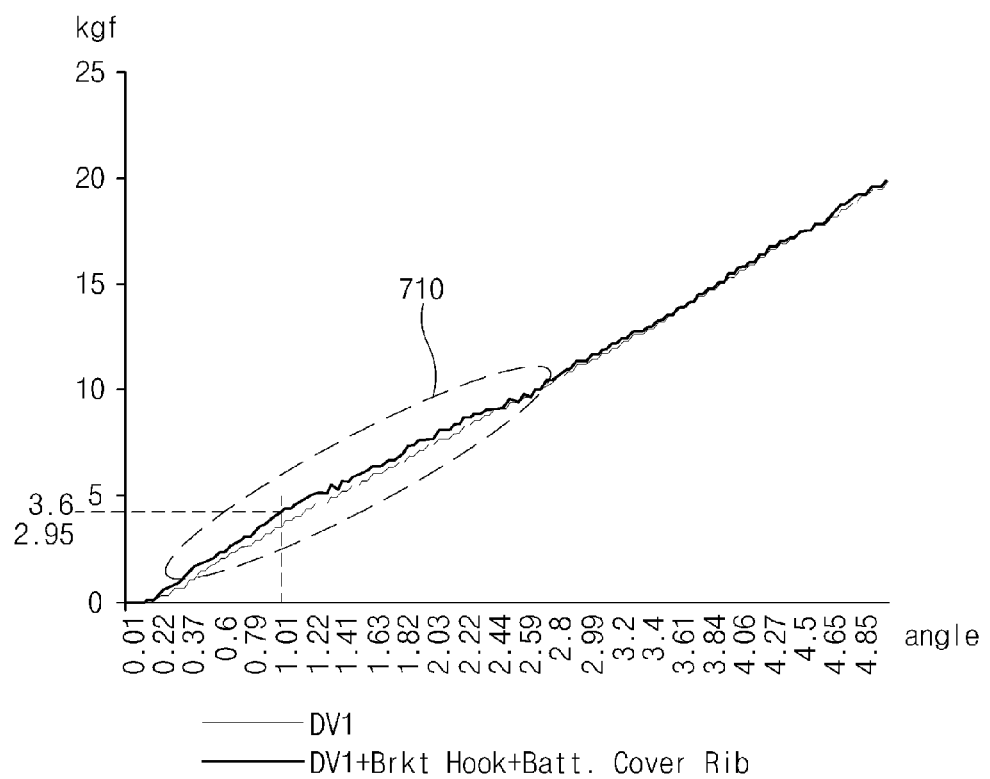
FIG. 7 is a graph illustrating a relationship between a force applied to an electronic device and a degree of twisting, according to an embodiment of the present disclosure.

FIG. 7 is a graph illustrating a relationship between a force applied to an electronic device and a degree of twisting, according to an embodiment of the present disclosure.

Referring to FIG. 7, the x-axis represents a twist angle of the electronic device when a twisting force is applied to an electronic device and the y-axis represents the twisting force applied to the electronic device. The bold solid line represents the values for the electronic device 101, according to an embodiment of the present disclosure, and the thin solid line represents the values for an electronic device, according to the related art.

Referring to an area 710, it is shown that the electronic device 101, according to an embodiment of the present disclosure, has a better result than the related art electronic device with respect to the relationship between a force applied to the electronic device 101 and a degree of twisting. For example, when approximately 3.6 kilogram-force (kgf) is applied to the electronic device 101, it is shown that the electronic device 101 is twisted by about 1°. On the other hand, when approximately 2.95 kgf is applied to an electronic device of the related art, it is shown that the related art electronic device is twisted by about 1°. That is, there is a 22% difference in the force required for twisting the electronic device 101 of the present disclosure to the same angle as the electronic device of the related art. That is, when an equivalent amount of external force is applied to both the electronic device 101 of the present disclosure and the electronic device of the related art, the electronic device 101 of the present disclosure has a greater amount of resistance so that it may prevent the detachment of the battery 330 well.

According to various embodiment of the present disclosure described herein, the battery 330 has a vertically long and horizontally short structure. However, when the battery 330, according to various embodiment of the present disclosure, has a vertically short and horizontally long structure, the front case 310, the rear case 320, the battery cover 340, the power connector 352, and each protruding part may change their forms to correspond thereto.

Figure 8:
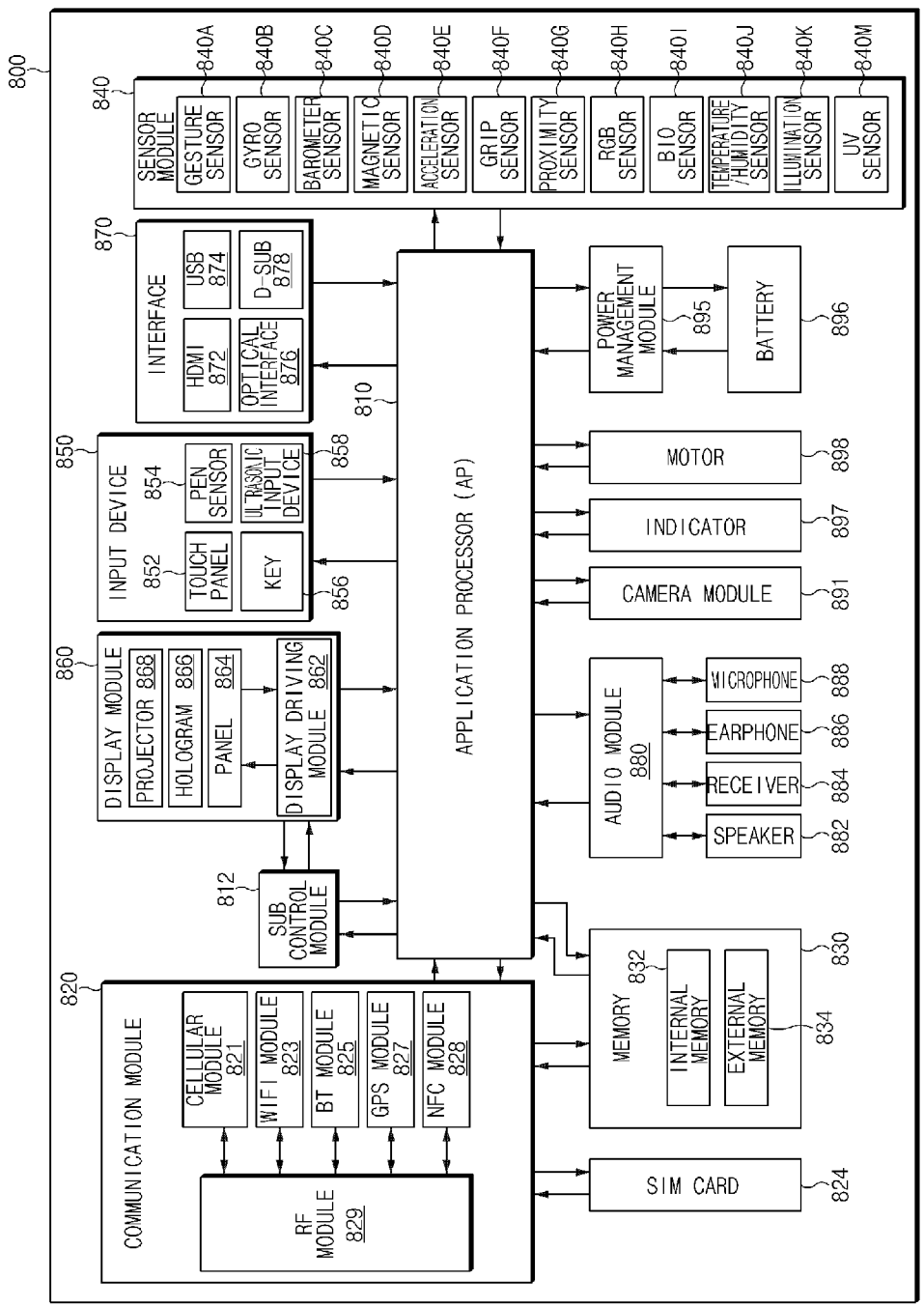
FIG. 8 is a block diagram of a configuration of an electronic device, according to an embodiment of the present disclosure.

FIG. 8 is a block diagram of a configuration of an electronic device, according to an embodiment of the present disclosure.

Referring to FIG. 8, the electronic device 801 is provided. The electronic device 801 may configure all or part of the above-mentioned electronic device 101 shown in FIG. 1.

The electronic device 801 includes Application Processor (AP) 810, a communication module 820, a subscriber identification module (SIM) card 824, a memory 830, a sensor module 840, an input device 850, a display 860, an interface 870, an audio module 880, a camera module 891, a power management module 895, a battery 896, an indicator 897, and a motor 898.

The AP 810 controls a plurality of hardware or software components connected to the AP 810 and also performs various data processing and operations with multimedia data by executing an operating system or an application program. The AP 810 may be implemented with a System on Chip (SoC), for example. According to an embodiment of the present disclosure, the AP 810 may further include a Graphic Processing Unit (GPU).

The communication module 820 (for example, the communication interface 160) performs data transmission/reception through a communication between other electronic devices (for example, the electronic device 104 and the server 106) connected to the electronic device 801 (for example, the electronic device 101) via a network. The communication module 820 includes a cellular module 821, a WiFi module 823, a BT module 825, a GPS module 827, an NFC module 828, and a Radio Frequency (RF) module 829.

The cellular module 821 provides voice calls, video calls, text services, or Internet services through a communication network (for example, LTE, LTE-A, CDMA, WCDMA, UMTS, WiBro, or GSM). Additionally, the cellular module 821 performs an authentication operation on an electronic device in a communication network by using the SIM card 824. The cellular module 821 may perform at least part of a function that the AP 810 provides. For example, the cellular module 821 may perform at least part of a multimedia control function.

The cellular module 821 may further include a Communication Processor (CP). Additionally, the cellular module 821 may be implemented with SoC. The components of the communication module 820, such as the cellular module 821 (for example, a CP), the memory 830, or the power management module 895 are illustrated separate from the AP 810, however, the AP 810 may be implemented to include some of the above-mentioned components (for example, the cellular module 821).

The AP 810 or the cellular module 821 (for example, a CP) loads instructions or data, which are received from a nonvolatile memory or at least one of other components connected thereto, into a volatile memory and then processes them. Furthermore, the AP 810 or the cellular module 821 stores data, received from or generated by at least one of the other components, in a nonvolatile memory.

Each of the WiFi module 823, the BT module 825, the GPS module 827, and the NFC module 828 includes a processor for processing data transmitted/received through a corresponding module. Although the cellular module 821, the WiFi module 823, the BT module 825, the GPS module 827, and the NFC module 828 are shown as separate blocks, some of the cellular module 821, the WiFi module 823, the BT module 825, the GPS module 827, and the NFC module 828 may be included in one Integrated Chip (IC) or an IC package. For example, at least some (for example, a CP corresponding to the cellular module 821 and a WiFi processor corresponding to the WiFi module 823) of the processors respectively corresponding to the cellular module 821, the WiFi module 823, the BT module 825, the GPS module 827, and the NFC module 828 may be implemented with one SoC.

The RF module 829 is responsible for data transmission, for example, the transmission of an RF signal. The RF module 829 may include a transceiver, a Power Amp Module (PAM), a frequency filter, or a Low Noise Amplifier (LNA). Additionally, the RF module 829 may further include components for transmitting/receiving electromagnetic waves on a free space in a wireless communication, for example, conductors or conducting wires. Although the cellular module 821, the WiFi module 823, the BT module 825, the GPS module 827, and the NFC module 828 are shown to share one RF module 829, at least one of the cellular module 821, the WiFi module 823, the BT module 825, the GPS module 827, and the NFC module 828 may perform the transmission of an RF signal through an additional RF module.

The SIM card 824 is a card which is inserted into a slot formed at a specific position of an electronic device. The SIM card 824 includes unique identification information (for example, an Integrated Circuit Card Identifier (ICCID)) or subscriber information (for example, an International Mobile Subscriber Identity (IMSI)).

The memory 830 (for example, the memory 130) includes an internal memory 832 or an external memory 834.

The internal memory 832 includes at least one of a volatile memory (for example, Dynamic RAM (DRAM), Static RAM (SRAM), Synchronous Dynamic RAM (SDRAM)) and a non-volatile memory (for example, One Time Programmable ROM (OTPROM), Programmable ROM (PROM), Erasable and Programmable ROM (EPROM), Electrically Erasable and Programmable ROM (EEPROM), mask ROM, flash ROM, NAND flash memory, and NOR flash memory).

The internal memory 832 may be a Solid State Drive (SSD).

The external memory 834 may further include flash drive, for example, compact flash (CF), Secure Digital (SD), micro Micro-SD, Mini-SD, extreme digital (xD), or a memory stick. The external memory 834 is functionally connected to the electronic device 801 through various interfaces. The electronic device 801 may further include a storage device (or a storage medium) such as a hard drive.

The sensor module 840 measures physical quantities or detects an operating state of the electronic device 801, thereby converting the measured or detected information into electrical signals. The sensor module 840 includes at least one of a gesture sensor 840A, a gyro sensor 840B, a barometric pressure sensor 840C, a magnetic sensor 840D, an acceleration sensor 840E, a grip sensor 840F, a proximity sensor 840G, a color sensor 840H (for example, a Red, Green, Blue (RGB) sensor), a biometric sensor 840I, a temperature/humidity sensor 840J, an illumination sensor 840K, and an Ultra Violet (UV) sensor 840M. Additionally or alternatively, the sensor module 840 includes an E-nose sensor, an electromyography (EMG) sensor, an electroencephalogram (EEG) sensor, an electrocardiogram (ECG)

sensor an infra red (IR) sensor, an iris sensor, or a fingerprint sensor. The sensor module 840 may further include a control circuit for controlling at least one sensor therein.

The input device 850 includes a touch panel 852, a (digital) pen sensor 854, a key 856, or an ultrasonic input device 858.

The touch panel 852 recognizes a touch input through at least one of capacitive, resistive, infrared, or ultrasonic methods, for example. Additionally, the touch panel 852 may further include a control circuit. In the case of the capacitive method, both direct touch and proximity recognition are possible. The touch panel 852 may further include a tactile layer. In this case, the touch panel 852 may provide a tactile response to a user.

The (digital) pen sensor 854 is implemented through a method similar or identical to that of receiving a user's touch input or may be implemented with an additional sheet for recognition.

The key 856 may include a physical button, an optical key, or a keypad, for example.

The ultrasonic input device 856 is a device which detects sound waves through a microphone (for example, a microphone 888) in the electronic device 801, and may provide wireless recognition through an input tool generating ultrasonic signals.

The electronic device 801 may receive a user input from an external device (for example, a computer or a server) connected to the electronic device 801 through the communication module 820.

The display 860 (for example, the screen 150) includes a panel 862, a hologram device 864, or a projector 866.

The panel 862 includes a Liquid-Crystal Display (LCD) or an Active-Matrix Organic Light-Emitting Diode (AM-OLED). The panel 862 may be implemented to be flexible, transparent, or wearable, for example. The panel 862 and the touch panel 852 may be configured with one module.

The hologram 864 displays three-dimensional images in the air by using the interference of light.

The projector 866 displays an image by projecting light on a screen. The screen, for example, may be placed inside or outside the electronic device 801. The display 860 may further include a control circuit for controlling the panel 862, the hologram device 864, or the projector 866.

The interface 870 includes a High-Definition Multimedia Interface (HDMI) 872, a Universal Serial Bus (USB) 874, an optical interface 876, or a D-subminiature (D-sub) 878.

The interface 870 may be included in the communication interface 160 shown in FIG. 1. Additionally or alternatively, the interface 870 includes a mobile High-Definition Link (MHL) interface, a Secure Digital (SD) card/Multi-Media Card (MMC) interface, or an Infrared Data Association (IrDA) standard interface.

The audio module 880 converts sound into electrical signals and converts electrical signals into sounds. At least some components of the audio module 880, for example, may be included in the input/output interface 140 shown in FIG. 1. The audio module 880 processes sound information inputted/outputted through a speaker 882, a receiver 884, an earphone 886, or a microphone 888.

The camera module 891, as a device for capturing a still image and a video, includes at least one image sensor (for example, a front sensor or a rear sensor), a lens an Image Signal Processor (ISP), or a flash (for example, an LED or a xenon lamp).

The power management module 895 manages the power of the electronic device 801. The power management module 895 may include a power management IC (PMIC), a charger IC, or a battery or fuel gauge, for example.

The PMIC may be built in an IC or SoC semiconductor, for example.

A charging method is classified into a wired method and a wireless method. The charger IC charges a battery and prevents overvoltage or overcurrent flow from a charger. The charger IC may include a charger IC for at least one of a wired charging method and a wireless charging method.

The wireless charging method includes, for example, a magnetic resonance method, a magnetic induction method, and an electromagnetic method. An additional circuit for wireless charging, for example, a circuit such as a coil loop, a resonant circuit, or a rectifier circuit, may be added.

The battery gauge measures a remaining amount of the battery 896, or a voltage, current, or temperature of the battery 896 during charging. The battery 896 stores or generates electricity and supplies power to the electronic device 801 by using the stored or generated electricity. The battery 896, for example, may include a rechargeable battery or a solar battery.

The indicator 897 displays a specific state of the electronic device 801 or part thereof (for example, the AP 810), for example, a booting state, a message state, or a charging state.

The motor 896 converts electrical signals into a mechanical vibration.

The electronic device 801 may include a processing device (for example, a GPU) for mobile TV support. A processing device for mobile TV support may process media data according to the standards such as Digital Multimedia Broadcasting (DMB), Digital Video Broadcasting (DVB), or MediaFLO.

Each of the above-mentioned components of the electronic device, according to various embodiments of the present disclosure, may be configured with at least one component and the name of a corresponding component may vary according to the kind of an electronic device. An electronic device, according to various embodiments of the present disclosure, may include at least one of the above-mentioned components, may not include some of the above-mentioned components, or may further include other components. Additionally, some of components may be configured as one entity, so that functions of previous corresponding components are performed identically.

The term "module" used herein may refer to a unit including a combination of at least one of hardware, software, and firmware. The term "module" and the terms "unit", "logic", "logical block", "component", and "circuit" may be interchangeably used. A "module" may be a minimum unit or part of an integrally configured component. A "module" may be a minimum unit performing at least one function or part thereof. A "module" may be implemented mechanically or electronically. For example, a "module" may include at least one of an Application-Specific Integrated Circuit (ASIC) chip performing certain operations, Field-Programmable Gate Arrays (FPGAs), or a programmable-logic device, all of which are known or to be developed in the future.

According to various embodiments of the present disclosure, at least part of a device (for example, modules or functions thereof) or a method (for example, operations) according to this disclosure, for example, as in a form of a programming module, may be implemented using an instruction stored in a non-transitory computer-readable storage media. When at least one processor (for example, the processor 120) executes an instruction, it may perform a function corresponding to the instruction. The non-transitory computer-readable storage media may include the memory 130, for example. At least part of a programming module may be implemented by the processor 120. At least part of a programming module may include a module, a program, a routine, sets of instructions, or a process to perform at least one function, for example.

The computer-readable storage media includes Magnetic Media such as a hard disk, a floppy disk, and a magnetic tape, optical media, such as Compact Disc Read Only Memory (CD-ROM) and Digital Versatile Disc (DVD), magneto-optical media such as floptical disk, and a hardware device especially configured to store and perform a program instruction (for example, a programming module) such as Read Only Memory (ROM), Random Access Memory (RAM), and flash memory. Additionally, a program instruction may include high-level language code executable by a computer using an interpreter in addition to machine code created by a complier. The hardware device may be configured to operate as at least one software module to perform an operation of the present disclosure and vice versa.

A module or a programming module, according to various embodiments of the present disclosure, may include at least one of the above-mentioned components, may not include some of the above-mentioned components, or may further include other components. Operations performed by a module, a programming module, or other components may be executed through a sequential, parallel, repetitive or heuristic method. Additionally, some operations may be executed in a different order, may be omitted, or other operations may be added.

Embodiments of the present disclosure disclosed in this specification and drawings are provided as specific examples to describe technical content and help in an understanding of the present disclosure and are not intended to limit the scope of the present disclosure. Accordingly, it should be understood by those skilled in the art that various changes in form and details may be made therein without departing from the spirit and scope of the disclosure as defined by the appended claims and their equivalents.

What is claimed is:

1. An electronic device comprising:
   a front case including a first battery slot that detachably receives a battery;
   a power connector disposed at one side of the front case; and
   a first protruding part protruded from a first sidewall of the first battery slot,
   wherein the first protruding part is disposed at a predetermined height from a bottom surface of the first battery slot,
   wherein a first end of a second protruding part and a second end of a third protruding part face each other,
   wherein, when the battery is inserted,
      a first end of a first projection of the battery faces the first end of the second protruding part; and
      a second end of the first projection of the battery faces the second end of the third protruding part, and
      wherein the first protruding part is disposed at the first sidewall of the first battery slot facing the power connector.

2. The electronic device of claim 1, wherein the first protruding part protrudes at a predetermined tilt angle from a surface of the first protruding part to an upper end of the first protruding part.

3. The electronic device of claim 1, wherein the first protruding part corresponds to a nail groove of the battery.

4. The electronic device of claim 1, wherein the first protruding part is spaced a predetermined distance from an upper end of the first battery slot, where a rear case is to be stacked.

5. The electronic device of claim 1, wherein the second protruding part is disposed between the bottom surface of the first battery slot and the first sidewall of the first battery slot,
   wherein the second protruding part supports the first projection of the battery in a rear direction of the electronic device.

6. The electronic device of claim 5, further comprising a rear case with a second battery slot,
   wherein the rear case and the front case are stacked to align the first battery slot and the second battery slot with one another.

7. The electronic device of claim 6, wherein the third protruding part protrudes from a first sidewall of the second battery slot,
   wherein the second protruding part and the third protruding part are disposed on an axis vertical from the bottom surface of the first battery slot.

8. The electronic device of claim 7, wherein a first projection of the battery is disposed between the second protruding part and the third protruding part.

9. The electronic device of claim 7, wherein a first end of the third protruding part protrudes at a predetermined tilt angle from the first sidewall of the second battery slot.

10. The electronic device of claim 7, wherein the second end of the third protruding part is extended vertical to the first sidewall of the second battery slot.

11. The electronic device of claim 7, further comprising:
   a battery cover detachable from the rear case; and
   a fourth protruding part protruded in a direction to the rear case from an inner surface of the battery cover.

12. The electronic device of claim 11, wherein when the rear case and the battery cover are coupled, a first end of the fourth protruding part is disposed at a second sidewall of the second battery slot.

13. The electronic device of claim 11, further comprising a fifth protruding part protruded from a second sidewall of the first battery slot,
   wherein the fifth protruding part is disposed at a predetermined height from the bottom surface of the first battery slot, and
   the second sidewall of the first battery slot and the first sidewall of the first battery slot face each other.

14. The electronic device of claim 13, wherein
   the battery comprises a second projection and a third projection; and
   the fifth protruding part is disposed between the second projection and the third projection of the battery; and
   the third projection of the battery is disposed between the bottom surface of the first battery slot and the fifth protruding part.

15. The electronic device of claim 13, wherein the power connector provides an elastic force for pushing the battery in a direction of the first protruding part.

16. The electronic device of claim 15, wherein one surface of the battery is spaced from the second sidewall of the first battery slot and the second sidewall of the second battery slot by the elastic force.

17. The electronic device of claim 16, wherein the fourth protruding part is disposed in a space formed by the elastic force.

18. The electronic device of claim 16, wherein the fourth protruding part is disposed between the second sidewall of the second battery slot and the second projection of the battery.

\* \* \* \* \*